May 20, 1924.
E. F. BROCK ET AL
RADIATOR TESTING DEVICE
Filed Jan. 14, 1922   2 Sheets-Sheet 1
1,494,990
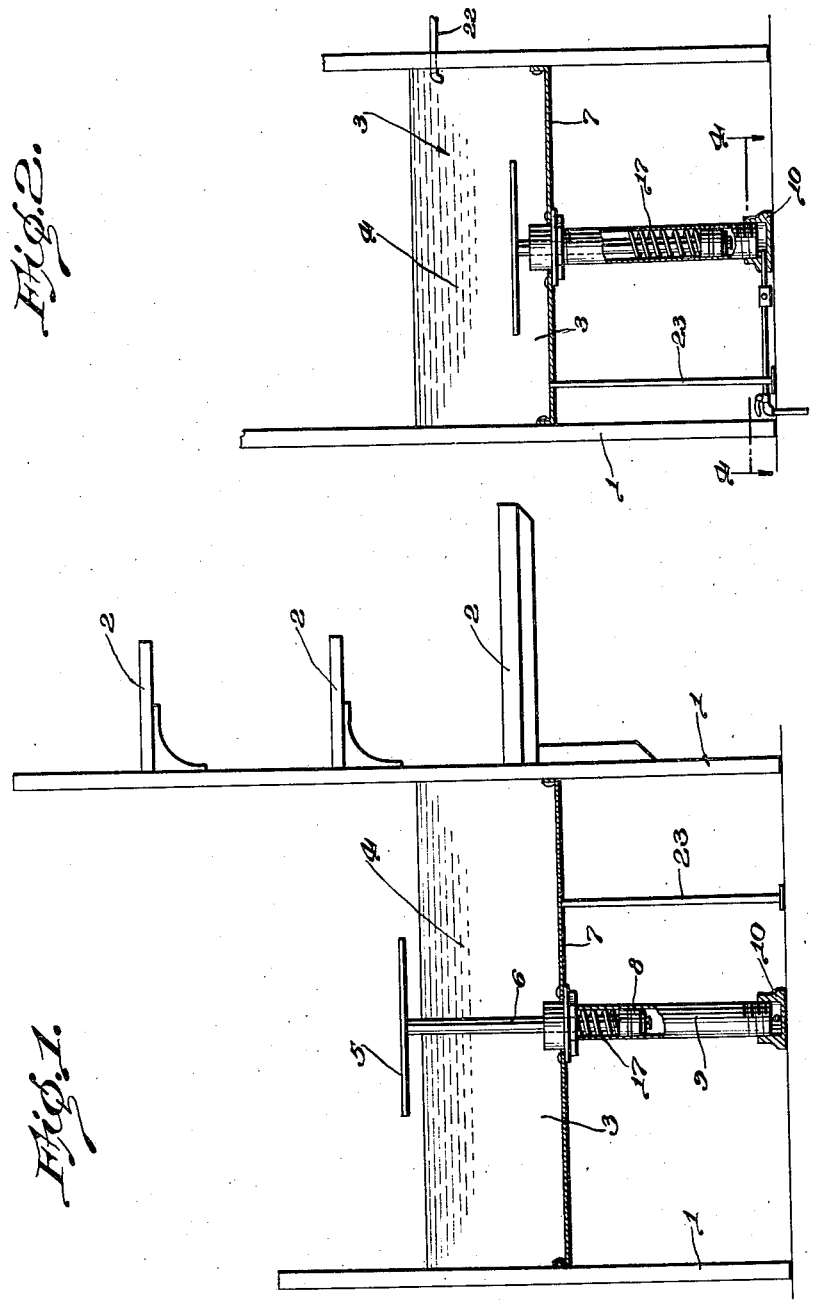
Edgar F. Brock
and Leo Brais
INVENTORS
BY *Victor J. Evans*
ATTORNEY
WITNESS:

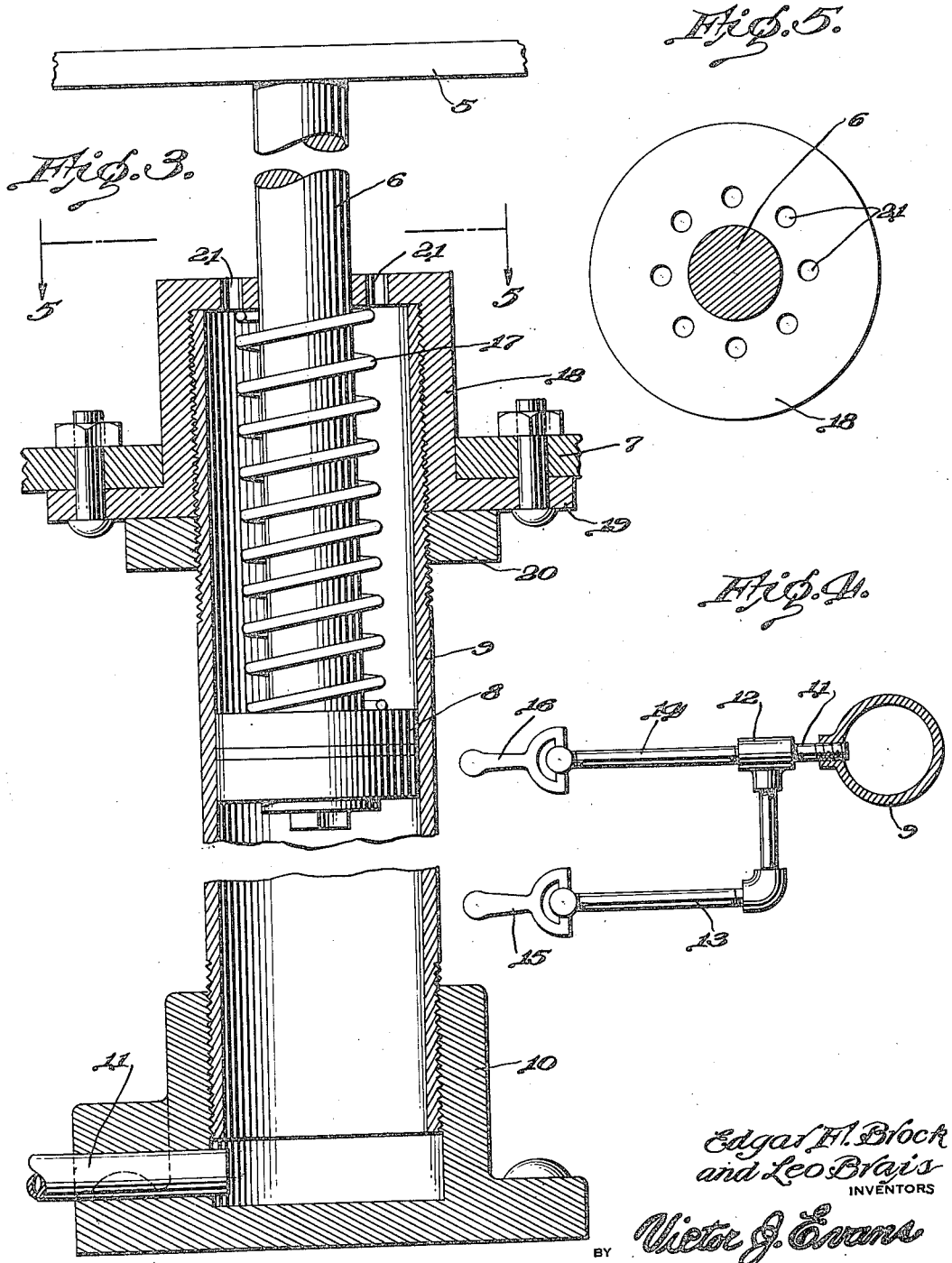

Patented May 20, 1924.

UNITED STATES PATENT OFFICE.

EDGAR F. BROCK AND LEO BRAIS, OF KANKAKEE, ILLINOIS.

RADIATOR-TESTING DEVICE.

Application filed January 14, 1922. Serial No. 529,219.

*To all whom it may concern:*

Be it known that we, EDGAR F. BROCK and LEO BRAIS, citizens of the United States, residing at Kankakee, in the county of Kankakee and State of Illinois, have invented new and useful Improvements in Radiator-Testing Devices, of which the following is a specification.

This invention relates to a device for testing radiators such as used in motor vehicle constructions, and an object of the invention is to provide a device whereby a radiator may be accurately tested to determine the location of any leaks therein, should there be such leaks.

Another object of this invention is to provide a device as specified which utilizes water and air, in the testing of radiators, the said device comprising a suitable tank or reservoir into which the radiators are placed, after which air is forced through the radiator causing a bubbling in the water, in case there are any leaks in the radiator, and further to provide a hydraulic mechanism for gradually raising the radiator through the water in the tank to permit accurate and positive locating of the leaks.

Other objects of the invention will appear in the following detailed description taken in connection with the accompanying drawings wherein:

Fig. 1 is a vertical section through the improved radiator testing device.

Fig. 2 is a vertical cross section through the radiator tester.

Fig. 3 is an enlarged detail section of a part of the tester structure.

Fig. 4 is a horizontal section taken on the line 4—4 of Fig. 2.

Fig. 5 is a detail section taken on the line 5—5 of Fig. 3.

Referring more particularly to the drawings, the improved radiator structure comprises a suitable support 1 which may have a plurality of shelves 2 carried thereby for supporting radiators and various tools which might be used in connection with the radiator testing device. A tank or reservoir 3 is supported by the support 1 and it is adapted to contain a quantity of water or similar fluid as indicated at 4 in which the radiator is immersed to test it. A radiator supporting table is provided which is carried by the upper end of a supporting standard 6. The supporting standard 6 projects through the bottom 7 of the tank 3 and has a piston 8 mounted upon its lower end which reciprocates in a pipe or cylinder 9. The pipe or cylinder 9 is supported by a suitable supporting base 10 with which a pipe 11 communicates. The pipe 11 has a T 12 connected thereto which is in turn connected to the water inlet pipe 13 and the outlet pipe 14. Foot operated valves 15 and 16 are provided for controlling the inlet and outlet of water into the cylinder 9, beneath the piston 8, as desired, to provide a hydraulic lift for the table 5. The inlet valve 15 is operated, when the radiator is placed upon the table 5 which gradually raises the radiator through the water 4 to permit accurate determining of the location of any leaks in the radiator.

A spring 17 is positioned within the cylinder 9 and is coiled about the standard 6 for cushioning the upward movement of the piston 8 and table 5 to prevent a sudden jar or shock at the upper terminus of the movement of the table.

A suitable coupling 18 is provided, into which the upper end of the cylinder 9 is threaded. The coupling 18 projects through the bottom 7 and is provided with an annular flange 19 which is clamped against the bottom by means of a lock nut 20. The coupling 18 is provided with a plurality of openings 21 to permit the escape of water from within the cylinder 9 during the upward movement of the piston 8. The table 5 is lowered by allowing the water to escape from within the cylinder 9 below the piston 8 and the speed of descent of the table can be controlled by operation of the valve 16. Water may be supplied to the tank 3 from any suitable source as indicated at 22 and an outlet pipe 23 is provided to permit draining of the tank when desired.

It is, of course, to be understood that the invention may be constructed in other manners, and the parts associated in other relations and, therefore, we do not desire to be limited in any manner except as set forth in the claims hereunto appended.

Having thus described our invention what we claim is:

1. A radiator testing device comprising a tank, a cylinder projecting from the bottom of said tank, a piston in said cylinder, a table connected to and supported from said piston, means for operating said piston, and a spring within the cylinder for cushioning upward movement of said table.

2. In a radiator testing device, a tank, a cylinder projecting from the bottom of said tank, a piston in said cylinder, a standard attached to said piston, a table carried by said standard, and foot operated valves for controlling the inlet and outlet of water into said cylinder beneath said piston for raising said table through said tank by hydraulic power, a spring within said cylinder, about said standard, and above said piston for cushioning the upward movement of the table.

In testimony whereof we affix our signatures.

EDGAR F. BROCK.
LEO BRAIS.